(No Model.)

J. WOLANDER.
ENDLESS SCREW CHAIN.

No. 595,508. Patented Dec. 14, 1897.

Witnesses

Inventor
John Wolander
his Attorney

UNITED STATES PATENT OFFICE.

JOHN WOLANDER, OF CANNON FALLS, MINNESOTA.

ENDLESS SCREW-CHAIN.

SPECIFICATION forming part of Letters Patent No. 595,508, dated December 14, 1897.

Application filed February 24, 1897. Serial No. 624,812. (No model.)

*To all whom it may concern:*

Be it known that I, JOHN WOLANDER, a citizen of the United States, residing at Cannon Falls, in the county of Goodhue and State of Minnesota, have invented certain new and useful Improvements in Endless Screw-Chains; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the present invention is to provide a screw or worm gear which will employ an endless chain in lieu of the ordinary gear-wheel, so that motion can be directly transmitted from a revolving shaft to an endless or link chain, and the same can be employed for the many mechanical purposes for the transmission of power and the actuating of machinery to which a sprocket-chain is applicable. This I accomplish by constructing an endless chain of links which carry a section of a screw adapted to engage with the threads of a screw-threaded shaft or worm; and the invention consists of the improved screw-threaded link chain as hereinafter described and claimed. A series of the screw-threaded links may be presented in alinement to the screw-threaded shaft and thus the strain distributed between a sufficient number of screw-threads to prevent undue wear or strain on any part.

Figure 1:
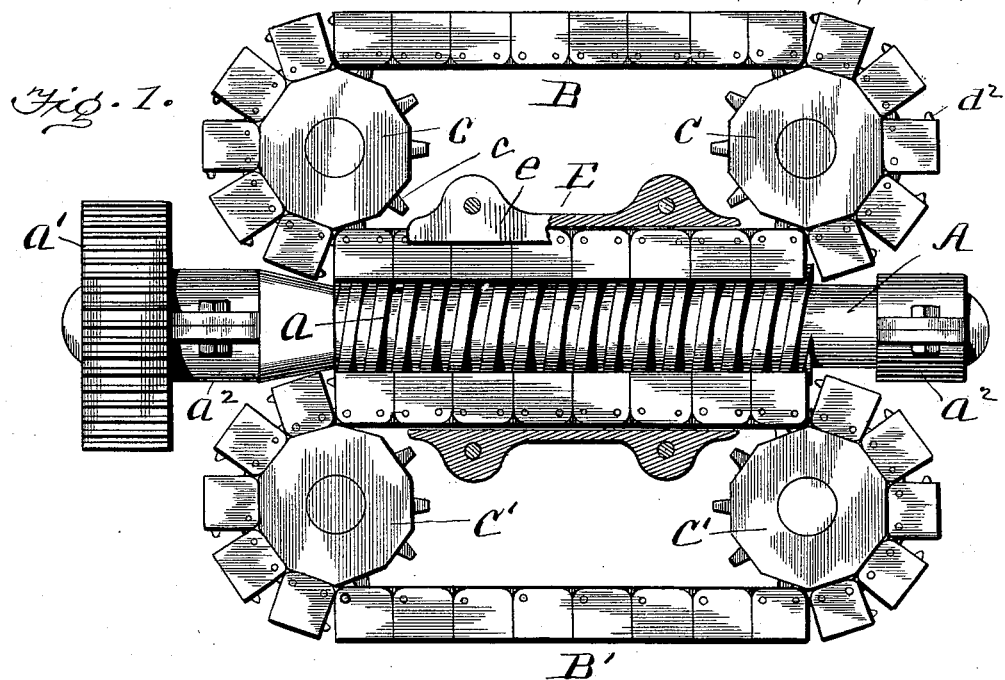
Figure 2:
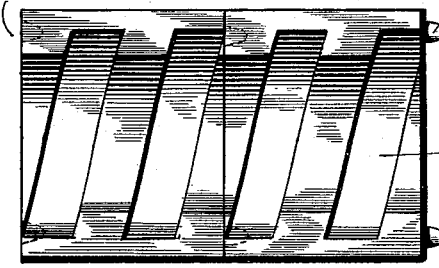
Figure 3:
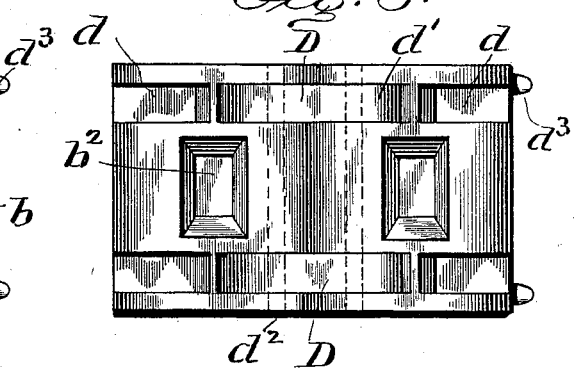
Figure 4:
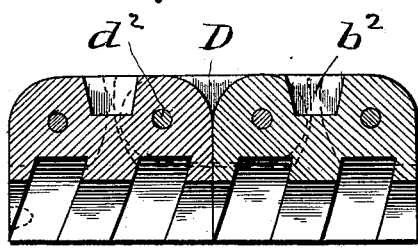

In the accompanying drawings, Figure 1 illustrates an application of the invention. Fig. 2 is a face view of a pair of screw-threaded link-blocks. Fig. 3 is a rear view of the same, and Fig. 4 is a longitudinal section thereof.

In the present case a screw-shaft A is shown as driving a pair of endless screw-threaded link chains B B', the latter passing around sprocket-wheels C C C' C'; but it will be understood that a link chain may be used on one side only of the worm, and that the invention is not necessarily limited in its scope and application to the precise details herein shown.

The shaft A has the screw-thread $a$, and for the purposes of illustration it is supposed to be revolved by power applied to the gear $a'$, $a^2$ $a^2$ being bearings for the shaft.

The link-blocks $b$ have on their outer faces a circular groove with sections of internal screw-threads $b'$, conforming to the screw-threads $a$ of the worm-spindle. On the rear face of the link-block there is a recess or seat $b^2$ for the sprocket-teeth $c$ of the sprocket-wheels, and the link-blocks are preferably coupled by means of sublinks D, which are shown as fitting into recesses $d$ of the link-blocks and rounded on their outer ends, as at $d'$, to admit of the free bending of the chain around the sprocket-wheels. The coupling-pins for the links are shown at $d^2$. The link-blocks have flat abutting end faces, and to secure a true register of the successive screw-sections each block may have dowel-studs $d^3$ on one end and corresponding recesses therefor, $d^4$, on the other. This construction of link chain with the screw-threaded blocks coupled by secondary links recessed into the blocks gives a chain with flat flush sides and one that is stiff and rigid against flexure inward. This is desirable in order that the screw-threaded surface of the endless chain as presented to the threads of the worm-spindle may be in effect the same as an integral threaded surface, rigid against flexure with respect to the part that is in engagement with the threads of the shaft. This being the case, any back pressure on the link chain is taken up by the rigidity of the chain itself; but to relieve the chain of any bending strain there may be provided a back plate E, having a guideway for the link chain, with side edges $e$ to hold it in true position. This guideway takes up any back thrust and holds the screw-threaded links in engagement with the shaft.

Having thus described my invention, what I claim is—

1. As a new article of manufacture, an endless chain formed of sections screw-threaded on their outer faces and having sprocket-seats for engagement with the teeth of a sprocket-wheel.

2. An endless chain having link-blocks with a longitudinal groove in their outer faces and internal screw-threads therein, with interfitting parts to secure true registration of thread-sections, in combination with sublinks recessed in and coupled to the link-blocks, as and for the purpose set forth.

3. The combination with a worm-shaft, of a pair of screw-threaded link sprocket-chains on opposite sides of the worm-shaft, and sprocket-wheels driven by the respective sprocket-chains, as and for the purpose set forth.

In testimony whereof I affix my signature in presence of two witnesses.

JOHN WOLANDER.

Witnesses:
  A. HUSELIJ,
  JOHN A. WILSON.